United States Patent [19]

Aikens

[11] Patent Number: 4,619,164
[45] Date of Patent: Oct. 28, 1986

[54] ORBITAL STRIPPING DEVICE
[75] Inventor: Paul W. Aikens, Etters, Pa.
[73] Assignee: E. I. Du Pont de Nemours and Company, Wilmington, Del.
[21] Appl. No.: 679,874
[22] Filed: Dec. 10, 1984
[51] Int. Cl.⁴ .............................................. B26D 3/08
[52] U.S. Cl. ...................................... 83/200; 83/530; 83/580; 83/596; 83/647; 83/924; 74/831
[58] Field of Search ................. 83/199, 200, 644, 646, 83/647, 530, 596, 601, 602, 628, 636, 580, 924, 926 B, 887, 185, 186; 81/9.4, 9.51; 74/18.1, 831, 837, 838, 839, 86; 29/33 F, 33.5, 33.52; 51/58, 73 R; 30/90.1

[56] References Cited
U.S. PATENT DOCUMENTS
2,457,417 12/1948 Trautman ............................ 30/272
3,562,779 2/1971 Oikawa ................................ 74/837
3,998,117 12/1976 Fujibayashi ......................... 83/199
4,003,279 1/1977 Carmichael et al. ................ 83/199
4,059,893 11/1977 Solury ............................... 30/90.1
4,199,995 4/1980 Murakami ........................... 74/838
4,378,823 4/1983 Normann et al. ................... 83/200

FOREIGN PATENT DOCUMENTS
093781 12/1983 Japan .
967695 10/1982 U.S.S.R. ............................. 83/199

Primary Examiner—Frank T. Yost
Assistant Examiner—Hien H. Phan

[57] ABSTRACT

A cable cutter and stripper uses fixed and moving plates, each having aligned orifices. The moving plate orifices have sharpened edges and are orbited in a plane parallel to the fixed plate to cut through the cable insulation. The radius of orbit is adjustable.

3 Claims, 8 Drawing Figures

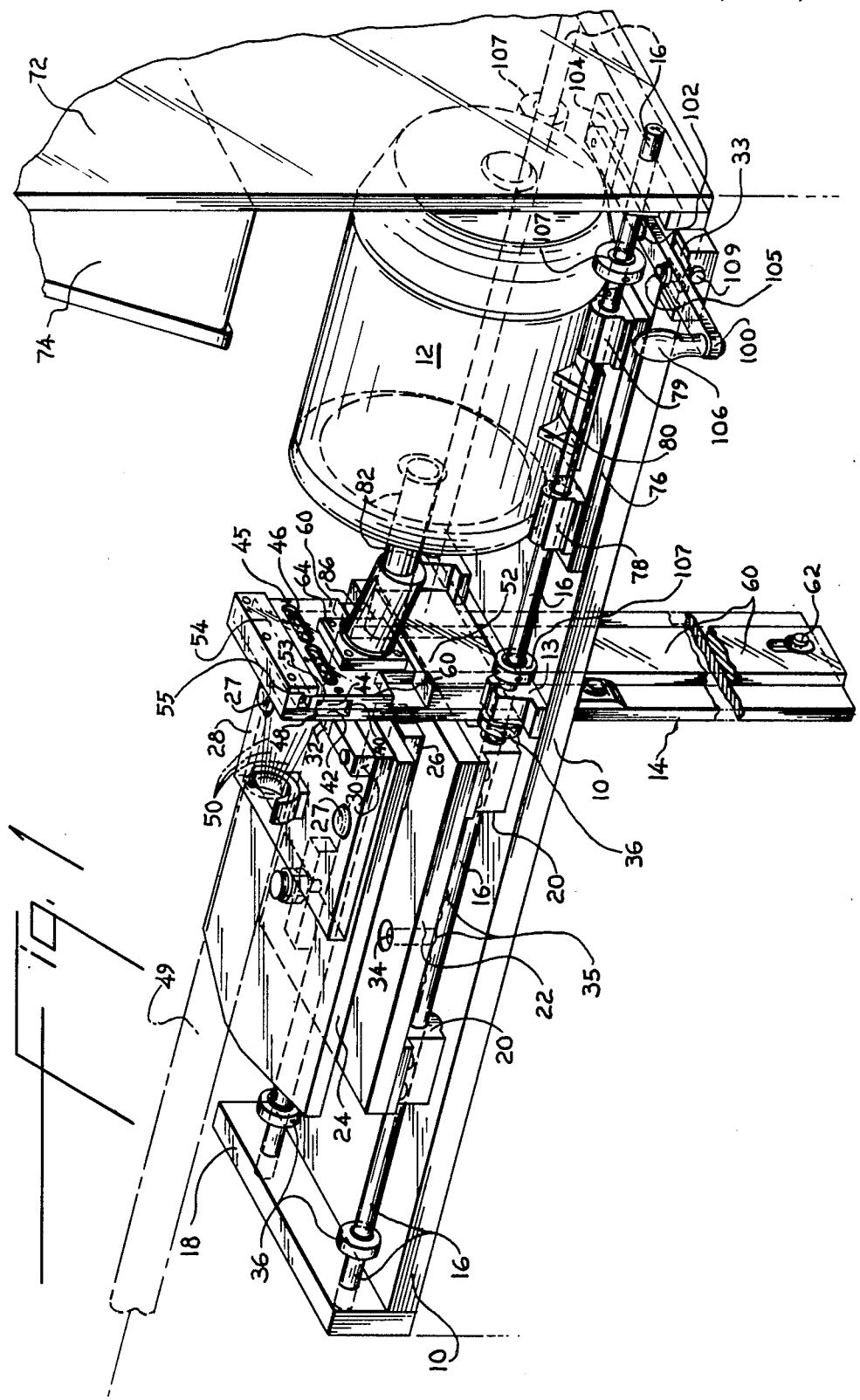

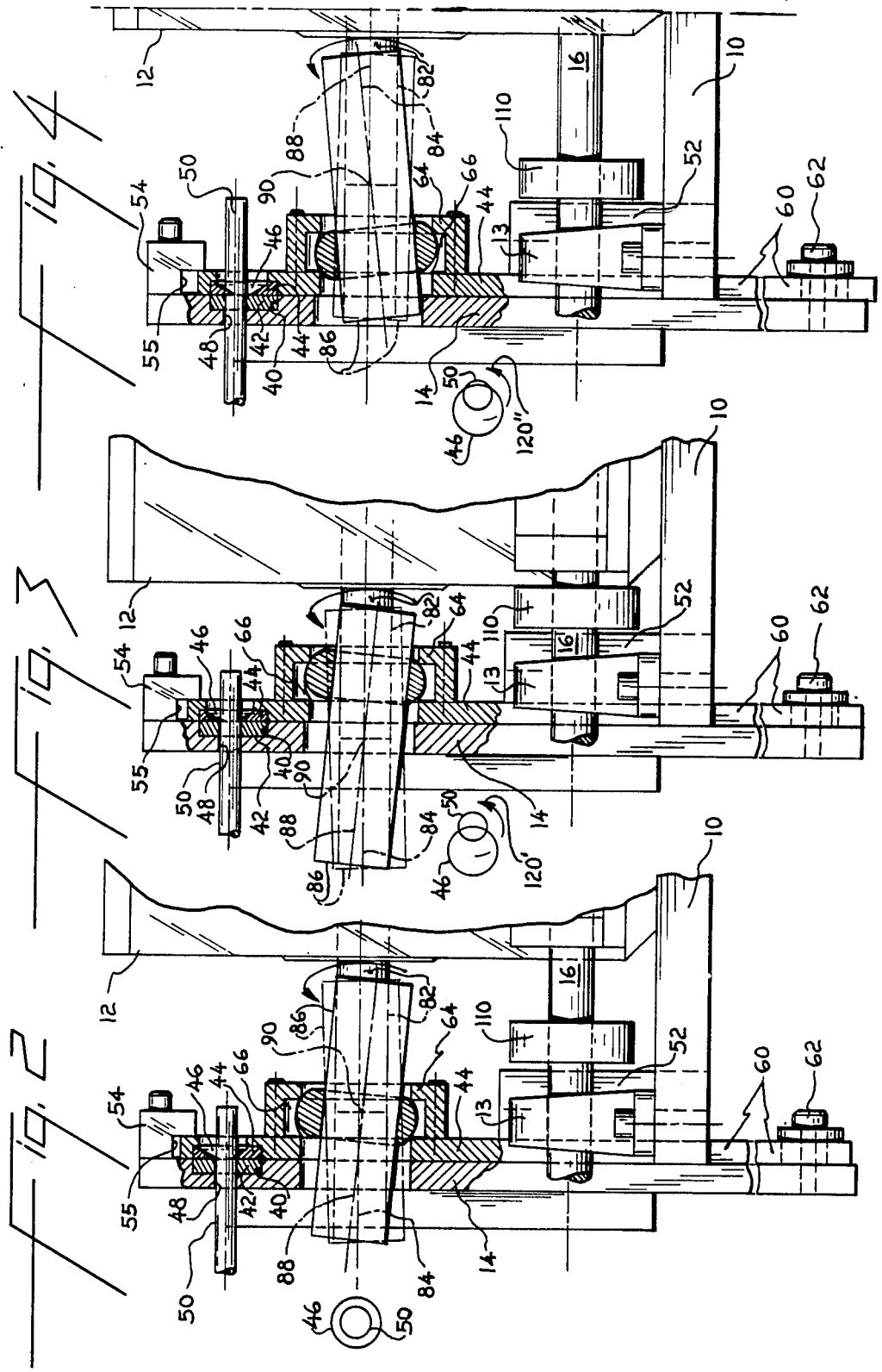

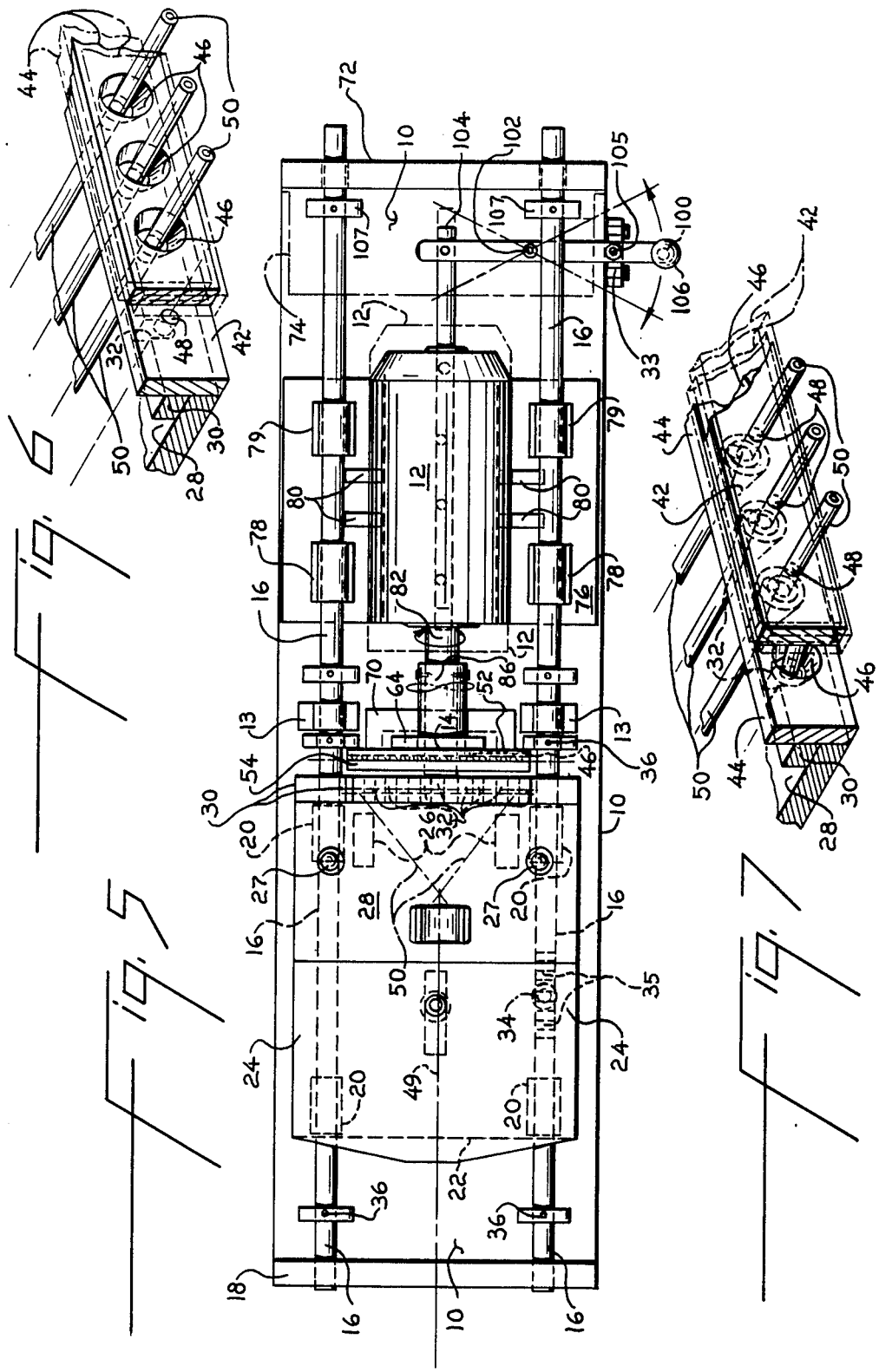

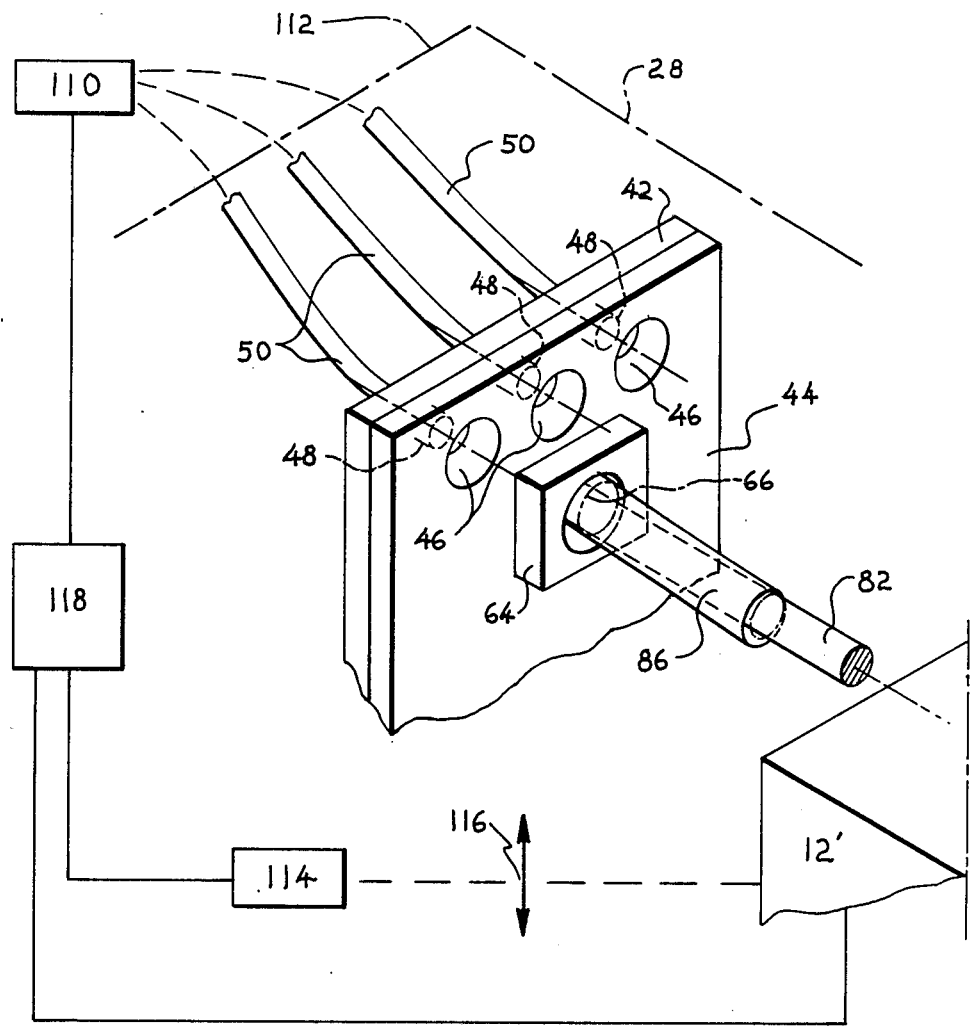
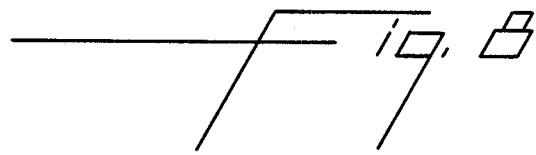

ORBITAL STRIPPING DEVICE

BACKGROUND OF THE INVENTION

This invention relates to an apparatus for selectively cutting the exerior layers of cables and, more particularly, to an apparatus that can be adjusted to facilitate cutting and stripping insulation from cables.

In the electrical connector industry, it is often necessary to connect multiple wires or cables to a particular connector. Before the connection can be made, the insulation from the cable or wire must be stripped, exposing the central wire so that it may be introduced into the connector for crimping, soldering, and the like.

This is a particular problem when a coaxial cable is used since there are several layers of insulation surrounding the central conductor. In addition there is usually a metal sheath surrounding a portion of the insulation. The exterior insulation must be stripped away from both the metal sheath and the central conductor so that the proper electrical connection can be made.

Various methods have been used in the prior art to achieve this result with machine strippers or cutters. Thus in U.S. Pat. No. 4,059,893 issued Nov. 29, 1977 to Solury, a rotating knife is used to cut the cable insulation. While this is generally satisfactory for stripping single cables one at a time it is difficult to use this particular method simultaneously for multiple cables which are to be connected to the closely spaced lugs of an electrical terminal. The rotating cutters cannot be spaced closely together or they will interfere with each others operation. In addition the use of a knife, in and of itself, requires frequent sharpening of the knife blade since the active cutting surface is relatively small.

Cutters in which a cutting ring, with a cutting edge forming the inside of the ring, orbits about the material to be cut are known from U.S. Pat. No. 2,457,415 issued Dec. 28, 1948 to Trautmann. A cutter of this type is adapted to cut rivets but has never been applied to electrical connectors either singly or in an array form. A similar cutter for tubes is described in U.S. Pat. No. 3,724,073 issued Apr. 3, 1973 Lewandowski.

Finally a multi-core connector plug cutter is described in Japanese patent application No. 093781 filed May 31, 1982. This application describes the use of an orbital cutter for cutting wires but does not contemplate cutting and stripping insulation from multiple cables. Furthermore it is difficult to adjust the radius and hence the depth of the cut made by the orbital motion of the cutters described in the Japanese Application. No provision is made to make two circumferential cuts each of a different depth on the same wire such as is required for a coaxial cable.

SUMMARY OF THE INVENTION

Many of the problems of the prior art cable strippers are solved by the apparatus of this invention which is capable of selectively, circumferentially cutting the exterior layers of cables. The apparatus includes a cutter plate with a preselected array of cutting orifices, means for positioning a plurality of cables parallel to an axis transverse to the plate in the preselected array with the end of each cable in a different orifice, and orbital means for effecting relative orbital motion, in a plane transverse to the axis, between the array of cables on the one hand and the plate on the other about the axes, whereby the cutting orifices progressively cut through the exterior layers of the cables.

In one embodiment of the invention, the orbital means includes a rotary prime mover having an output shaft with an axis of rotation, a rod-like member having an axis and mounted on the output shaft with the member's axis aparallel to the shaft's axis of rotation so that the peripheral surface of the member defines the orbital motion, a bearing housed by one of the plates and positioning means adapted to slidingly receive the rod-like member and transmit the orbital motion to the plate of one of the cutter plates and positioning means. The orbital means preferably includes means to adjust the radius of the orbital motion. Further the rod-like member is positioned so that the axes of rotation of the shaft and rod-like member intersect in the region of the rod-like member and the rod-like member is positioned in the bearing at the point of intersection of the axes, whereby axial movement of the prime mover in either direction increases the radius of the orbital movement.

With a cutter of this type, movement of the prime mover in a first direction will cause a particular orbital radius say of sufficient magnitude to cut through all of the layers of a coaxial cable down to the central conductor. The coaxial cable now is repositioned axially through the cutting orifice to a greater extent. The prime mover is again adjusted into an axial position to have a smaller orbital radius and the insulation is cut exterior to the wire sheath. Now by withdrawing the cable while the cutter is in position, all of the undesired insulation is quickly removed from the cable and the central conductor and wire sheath is exposed.

The cutter is simple in concept, fast in operation, easy to adjust its cutting depth, capable of simultaneously cutting and stripping multiple wires, and can be adjusted to make different cuts of different depths on the same wire.

BRIEF DESCRIPTION OF THE DRAWINGS

The invention will be more fully understood from the following detailed description thereof taken in connection with the accompanying drawings which form a part of this application and in which:

FIG. 1 is a pictorial representation of an apparatus constructed in accordance with the preferred embodiment of this invention;

FIG. 2 is a fragmentary plan view, partially cut away, depicting the orbiting shaft in a position to have no orbital radius;

FIG. 3 is the same plan view as FIG. 2, but with the orbital shaft adjusted along its axis in a first sense to effect a greater orbital radius and hence a deeper cut in the cable insulation down to the central conductor;

FIG. 4 is a plan view similar to FIG. 2 with the orbital shaft adjusted along its axis to a withdrawn position so that the orbital radius is sufficient only to cut through cable insulation to the metal sheath;

FIG. 5 is a plan view of the apparatus seen in FIG. 1;

FIG. 6 is a fragmentary pictorial view of the cutting plate and the positioning plate with the cutting plate movable;

FIG. 7 is a fragmentary pictorial view of the cutting plate and the positioning plate with the positioning plate effecting the orbital motion; and FIG. 8 is a partial schematic, partial pictorial view of a control system that may be used with the apparatus of FIG. 1.

DETAILED DESCRIPTION OF THE PREFERRED EMBODIMENT

The apparatus of this invention is perhaps seen most clearly in FIGS. 1 and 5. A platform 10 serves as the base support for the apparatus. On the left hand portion (in the drawing) of the platform are fixtures for mounting or for positioning wires whose insulation is to be cut and on the right hand portion of the platform is positioned a drive motor 12. A center support 14 is vertically positioned through a slot in the platform at the mid portion thereof. Stationary mounting shafts 16 are secured by end mounting brackets 18 and 72 secured to the ends of the platform 10 and a center bracket 13. Slide bearings 20 secured to each bottom corner of a base plate 22 slide on the shafts 16. A fixture mounting plate 24 is secured to spacer blocks 26 which in turn are secured to the base plate 22 by any suitable means such as screws or welding. Mounting pins 27 positioned in the top surface of the fixture mounting plate 24 facilitate the mounting of a fixture 28. The fixture 28 has an end piece 30 with plural parallel wire notches 32 formed in the top surface thereof, each adapted to receive a separate coaxial cable or other wire whose insulation is to be selectively cut and/or stripped in accordance with this invention. Thus by sliding the base plate 22 along the shafts 16, the fixture 28 may be moved toward or away from the center support 14.

A detent 34 extending from the bottom side of the base plate 22 acts to engage notches 35 in the shaft 16 such that the base plate 22 when slid on the shaft 16 may lock into one or more separate positions, as will be described. In the case of coaxial cable, two such positions are selected, one for the insulation cut off point for the central conductor and one for the cut off point of the insulation surrounding the metal sheath. Stops 36 are positioned on the shaft 16 to limit the movement of the base plate 22.

The upper portion of the center support 14 has a horizontal slot 40 formed therein adapted to receive a wire positioning plate 42 which is perhaps seen most clearly in FIG. 6. This plate 42 has a plurality of orifices 40 positioned immediately adjacent each other with a spacing corresponding to the spacing of the wire notches 32. A cutter plate 44 positioned adjacent and parallel to the positioning plate 42 has a preselected array of cutting orifices 46, corresponding in location to the orifices 40, each of which may have a single slope or double slope surface forming an inner, ring-like cutting edge. In this manner, the cable or wires 50, when positioned in the orifices 48, are in alignment with and may pass through the respective cutting orifice 46.

The cutter plate 44 is slidably positioned with respect to positioning plate 42 by a slot 53 in the backface of a vertically positioned cutter mounting plate 60. The plate 60 is slidably retained by a vertical slot in a U-shaped mounting bracket 52 secured to center support 14 and by a slot 55 formed by a head flange 54 secured to the top of center support 14. The cutter plate 44 is secured as by screws in the slot 53 in the cutter mounting plate 60. The lower end of the cutter mounting plate 60 is pivotally mounted at 62 to the center support 14. The cutter mounting plate 60 also has secured thereto a bearing housing 64, as by screws which, houses a spherical self-aligning bearing 66 as seen most clearly in FIG. 2.

The end support 72 is secured to the right hand end of platform 10 and houses at the upper portion what may be described as a control panel 74. The end of the shafts 16 are secured in the support 72. The motor 12 is mounted on a movable motor plate 76 to which are attached bearings 78, 79 which slide on the shafts 16. The motor itself is mounted with the aid of a motor support guide 80 which is secured to the motor plate 76.

The motor has a motor drive shaft 82 having an axis of rotation 84 (FIG. 2). Secured as by welding or a set screw (not shown) at the end of the motor shaft 82 in an offset manner is an orbiting shaft 86 (having a bore to receive the motor shaft) having an axis 88 which intersects the axis 84 of the motor shaft at a point 90 corresponding to the center of the spherical bearing 66 when the motor is in a neutral position as will be described. The orbiting shaft 86 which passes throughout the bearing 66, when positioned at this manner, does not cause orbital motion of the bearing housing 64 or the cutter plate 44. However, by moving the motor 12 along the axis of its drive shaft 82 in either direction, the axes 84 and 88 diverge by increasing amounts thereby causing orbital motion of the cutter plate 44 when the motor shaft rotates.

To achieve the axial adjustment of the motor position 12, a pivot rod 100, pivoted as at 102 to the platform 10, is positioned to slide a bar 104 attached to the motor plate 76. A detent 105 on the block 109 engages recesses 33 in the block 109 to control the axial movement of the motor and hence the radius of the orbital motion of the cutter plate 44 to predetermined amounts. A handle 106 may be secured to the pivot rod 100 to facilitate this motion. As will be described in connection with FIG. 8, the movement of this pivot rod or the axial position of the motor may be adjusted by a servo system (not shown). The position of the base plate 22 and hence the position of fixture 28 may be similarly driven. Stop 107 limits the axial movement of the motor as a safety precaution.

In operation, a cable 49 containing plural coaxial cables, for example, is opened manually so that the individual coaxial cables may each be placed in the wire notches 32 of the fixture 28 with each cable extending through the wire positioning notches 32, the wire positioning orifices 48 and finally the cutting orifices 46 of the cutter plate 44. Next the motor 12 is energized causing the orbiting plate 44 to orbit about an axis generally parallel to the cables 50. Its initial position (FIG. 2), as determined by the position of the detent 105, however, is such that the axes 84 and 86 of the respective orbiting shaft 86 and the motor shaft 82 coincide at the center point 90 of the bearing 66. Hence no significant orbital motion of plate 44 occurs and the orifices 46 remain concentrically positioned about the cables 50.

To cut through the outer layers of coaxial cables 50 to the center conductor, the pivot rod 100 is moved to the right of the drawing thereby causing the motor 12 to move to the left (FIG. 3) and causing the orbiting shaft 86 to slide through the bearing 66 until the detent 105 stops it. The spherical bearing 66 now is rotating at a point relatively close to the motor shaft 82 (done because the maximum cut is made at this point and this reduces sideways forces on the motor shaft) and the radius of the orbit is at a maximum. The edges of the cutting orifices 46 thus orbit as is seen in FIG. 3 at 120' to cut through most of the cable 50 except for the center conductor. The orbital motion also is depicted by the phantom lines 44 of FIG. 6.

Next the base plate 22 is moved to the right in the drawing (FIG. 4) such that the wires 50 extend through the cutting plate more. Thus the cut may be made in the insulation over the metal sheath of the cable 50 at a point behind the first cut. The pivot rod 100 is moved to the left (in the drawing) causing the motor to move to the right and withdraw the orbiting shaft 46 past its axial center point until the detent 105 stops its motion and orbital motion 120'' of the cutting orifices 46 about the cable 50 again occurs because of the divergence of the axes 84 and 88 (FIG. 4). Effecting the orbital motion 120'' from the end of the orbiting shaft, does not cause undo transverse strain on the motor bearings since the cut is relatively shallow at this point, the orbit being adjusted to have a relatively low radius sufficient only to cut the exterior insulation away from the metal sheath.

With the multiple cutting orifices closely spaced, multiple conductor cables may be all cut at the same time which greatly facilitates connector assembly. Following cutting, the fixture 28 may be removed from the cutting assembly simply by lifting the fixture from the pins 27 and withdrawing the wires from the cutting orfices 46, leaving the insulation. This effectively removes the insulation from the wires. The adjustability of the orbit radius is particularly desirable since the apparatus may be used to cut many different sized and types of wire structures. Adjustment of the orbit is relatively quick, easy and simple.

An automated system for effecting the double cut on a wire or cable may be seen in FIG. 8. This system is seen to include the wire positioning plate 42, the cutter plate 44, the fixture assembly 28, the bearing 66, the bearing housing 64, the orbiting shaft 86, the motor shaft 82, and the motor 12'. Wires 50 are illustrated as being in position with the wires extending through the cutter plate 44. An additional motor 110, which may be a stepping motor, is connected by a suitable mechanical linkage 112 to position the fixture plate 28 by acting directly on the base plate 22 (FIG. 1). The axial position of the motor 12' is controlled by a stepping motor 114 which acts through a suitable mechanical linkage 116 to position the motor 12' along its axis. The three motors 110, 114 and 12' operate under the control of what may be a microprocessor control sequencer 118. Such sequencers are of well known design and selectively actuate the motors to move or position the fixture plate 28, the motor 12' along its axis, and power the motor 12' to rotate its shaft 82. Thus the orbital radius of the orifices is adjusted by axially positioning the motor 114, the drive for effecting cutting by the orifices 46 is effected by the rotation of motor 12' and the withdrawal and insertion of the wires is accomplished by the motor 110. Since programming techniques for achieving the operations are well known it is not believed necessary to describe a particular system for accomplishing this. Alternatively a motor drive stepping switch may accomplish the same result, although, such is not quite as versatile.

It should be pointed out, as may be seen in FIG. 7, that the wire positioning plate 42 and the cutting plate 44 may be reversed i.e., the cutter plate 44 will be fixedly positioned in the slot 40 while the wire positioning plate 42 is positioned in the mounting bracket 60. From this it is apparent that the wires are orbited against the cutter edge. The use of the orbital motion extends the life of a cutting edge.

The system is a quick, efficient and economical means for the mass stripping of wires and the like. With the system wires can be simultaneously circumferential cut in one or more places. The depth of each cut is readily adjustable.

I claim:

1. Apparatus for selectively cutting the exterior layers of a plurality of cables each having a central conductor comprising:

a cutter plate with a preselected array of cutting orifices, a positioning plate having an array of positioning orifices corresponding to the cutting orifices for positioning a plurality of cables parallel to an axis transverse to the cutter plate with the end of each cable in a different orifice, the plates being slidiably positioned relative to each other, a movable fixture adapted to hold the cables, the fixture being movable along the axis to adjust the position of the cables relative to the plates orbital means for effecting relative orbital motion, in a plane transverse to the axis, between the two plates about the axis, whereby the cutting orifices progressively cut through the exterior layers of the cables, the orbital means including a rotary prime mover having an output shaft with an axis of rotation, a rod-like member having an axis and mounted on the output shaft with the member's axis non-parallel to the shaft's axis of rotation so that the peripheral surface of the member defines the orbital motion, a bearing housed by one of the plates and positioning means adapted to slidingly receive the rod-like member and transmit the orbital motions to one of the cutter plate and positioning means, means to position the output shaft along its axis relative to the bearing thereby to adjust the axial position of the rod-like member in the bearing and hence the radius of the obital motion, the adjusting means including a slide mount for the prime mover to permit movement of the prime mover along the axis of shaft rotation, and means to position the prime mover along the axis of rotation to adjust the radius of orbital motion, the rod-like member being positioned so that the axis of rotation of the shaft and rod-like member intersect in the region of the rod-like member and the rod-like member is positioned in the bearing at the point of intersection of the axes, whereby axial movement of the prime mover in either direction increases the radius of orbital movement, and means to position the fixture along the axis to advance to or withdraw the cables from the plates, thereby to permit the simultaneous stripping of the exterior cut layers from the cables by withdrawing the cables from the plates.

2. An apparatus as set forth in claim 1 wherein the orbital means moves the positioning plate and hence the individual cables and the cutter plate remains stationary.

3. An apparatus as set forth in claim 1 wherein the orbital means moves the cutter plate and the positioning plate remains stationary.

* * * * *